(12) United States Patent
Detweiler et al.

(10) Patent No.: US 11,045,672 B2
(45) Date of Patent: Jun. 29, 2021

(54) FIRE SUPPRESSION AND IGNITION WITH UNMANNED AERIAL VEHICLES

(71) Applicant: NUtech Ventures, Lincoln, NE (US)

(72) Inventors: Carrick Detweiler, Lincoln, NE (US); Sebastian Elbaum, Lincoln, NE (US); James Higgins, Lincoln, NE (US); Christian Laney, Papillion, NE (US); Craig Allen, Crete, NE (US); Dirac Twidwell, Lincoln, NE (US); Evan Michael Beachly, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 47 days.

(21) Appl. No.: 15/768,768

(22) PCT Filed: Oct. 17, 2016

(86) PCT No.: PCT/US2016/057350
§ 371 (c)(1),
(2) Date: Apr. 16, 2018

(87) PCT Pub. No.: WO2017/066765
PCT Pub. Date: Apr. 20, 2017

(65) Prior Publication Data
US 2018/0296865 A1   Oct. 18, 2018

Related U.S. Application Data

(60) Provisional application No. 62/242,485, filed on Oct. 16, 2015.

(51) Int. Cl.
*A62C 3/02* (2006.01)
*B64C 39/02* (2006.01)
(Continued)

(52) U.S. Cl.
CPC ............ *A62C 3/025* (2013.01); *B64C 39/024* (2013.01); *B64D 1/02* (2013.01); *B64D 1/16* (2013.01);
(Continued)

(58) Field of Classification Search
CPC ..... A62C 3/025; A62C 3/0228; A62C 3/0278; A62C 3/02; A62C 3/0285; B64D 1/02;
(Continued)

(56) References Cited

U.S. PATENT DOCUMENTS

| 4,193,465 | A | * | 3/1980 | Henry | G01G 13/18 |
| | | | | | 177/108 |
| 4,426,050 | A | * | 1/1984 | Long | B64D 37/12 |
| | | | | | 244/135 R |

(Continued)

FOREIGN PATENT DOCUMENTS

| JP | 5410855 B2 * | 2/2014 |
| WO | WO 2017/066765 A1 | 4/2017 |

OTHER PUBLICATIONS

Notification of Transmtital of the Interanational Search Report and the Written Opinion of the International Searching Authority, or the Declaration for International Application No. PCT/US2016/057350 (dated Dec. 23, 2016).
(Continued)

*Primary Examiner* — Jason J Boeckmann
(74) *Attorney, Agent, or Firm* — Jenkins, Wilson, Taylor & Hunt, P.A.

(57) ABSTRACT

An unmanned aerial vehicle (UAV) can be configured for fire suppression and ignition. In some examples, the UAV includes an aerial propulsion system, an ignition system, and a control system. The ignition system includes a container of delayed-ignition balls and a dropper configured, by virtue of one or more motors, to actuate and drop the delayed-ignition
(Continued)

balls. The control system is configured to cause the UAV to fly to a site of a prescribed burn and, while flying over the site of the prescribed burn, actuate one or more of the delayed-ignition balls. After actuating the one or more delayed-ignition balls, the UAV drops the actuated one or more delayed-ignition balls from the UAV onto the site of the prescribed burn.

25 Claims, 11 Drawing Sheets

(51) Int. Cl.
　　　*B64D 1/16*　　　(2006.01)
　　　*B64D 1/02*　　　(2006.01)
　　　*G05D 1/00*　　　(2006.01)
(52) U.S. Cl.
　　　CPC ......... *G05D 1/0016* (2013.01); *G05D 1/0038* (2013.01); *G05D 1/0055* (2013.01); *B64C 2201/024* (2013.01); *B64C 2201/027* (2013.01); *B64C 2201/12* (2013.01); *B64C 2201/123* (2013.01); *B64C 2201/141* (2013.01); *B64C 2201/146* (2013.01)
(58) Field of Classification Search
　　　CPC .. G05D 1/0016; G05D 1/0038; G05D 1/0055; B64C 2201/024; B64C 2201/12; B64C 2201/146; B64C 39/024
　　　See application file for complete search history.

(56) References Cited

U.S. PATENT DOCUMENTS

| | | |
|---|---|---|
| 5,267,501 A | 12/1993 | Shillig |
| 5,797,105 A | 8/1998 | Nakaya et al. |
| 8,165,731 B2 | 4/2012 | Akcasu |
| 8,316,750 B2 | 11/2012 | Toeckes et al. |
| 2005/0139363 A1 | 6/2005 | Thomas |
| 2008/0125920 A1 | 5/2008 | Miles et al. |
| 2014/0027131 A1 | 1/2014 | Kawiecki |
| 2014/0283672 A1 | 9/2014 | Sparling |
| 2014/0303884 A1* | 10/2014 | Levien .................. G08G 5/04 701/301 |

OTHER PUBLICATIONS

Beachly et al., "A micro-UAS to Start Prescribed Fires," Computer Science and Engineering Department, University of Nebraska; US. Geological Survey—Nebraska Cooperative Fish and Wildlife Unit; Department of Agronomy and Horticulture, University of Nebraska, pp. 1-12 (Mar. 21, 2017).

NIFC WFA, "Historical Wildland Firefighter Fatality Reports—Wildland Fire Accidents by Type of Accident," http://www.nifc.gov/safety/safety_HistFatality_report.html , pp. 1-4 (Accessed Apr. 22, 2015).

Ore, "Autonomous Aerial Water Sampling," Computer Science and Engineering: Theses, Dissertations, and Student Research, vol. 71, pp. 1-112 (2014).

* cited by examiner

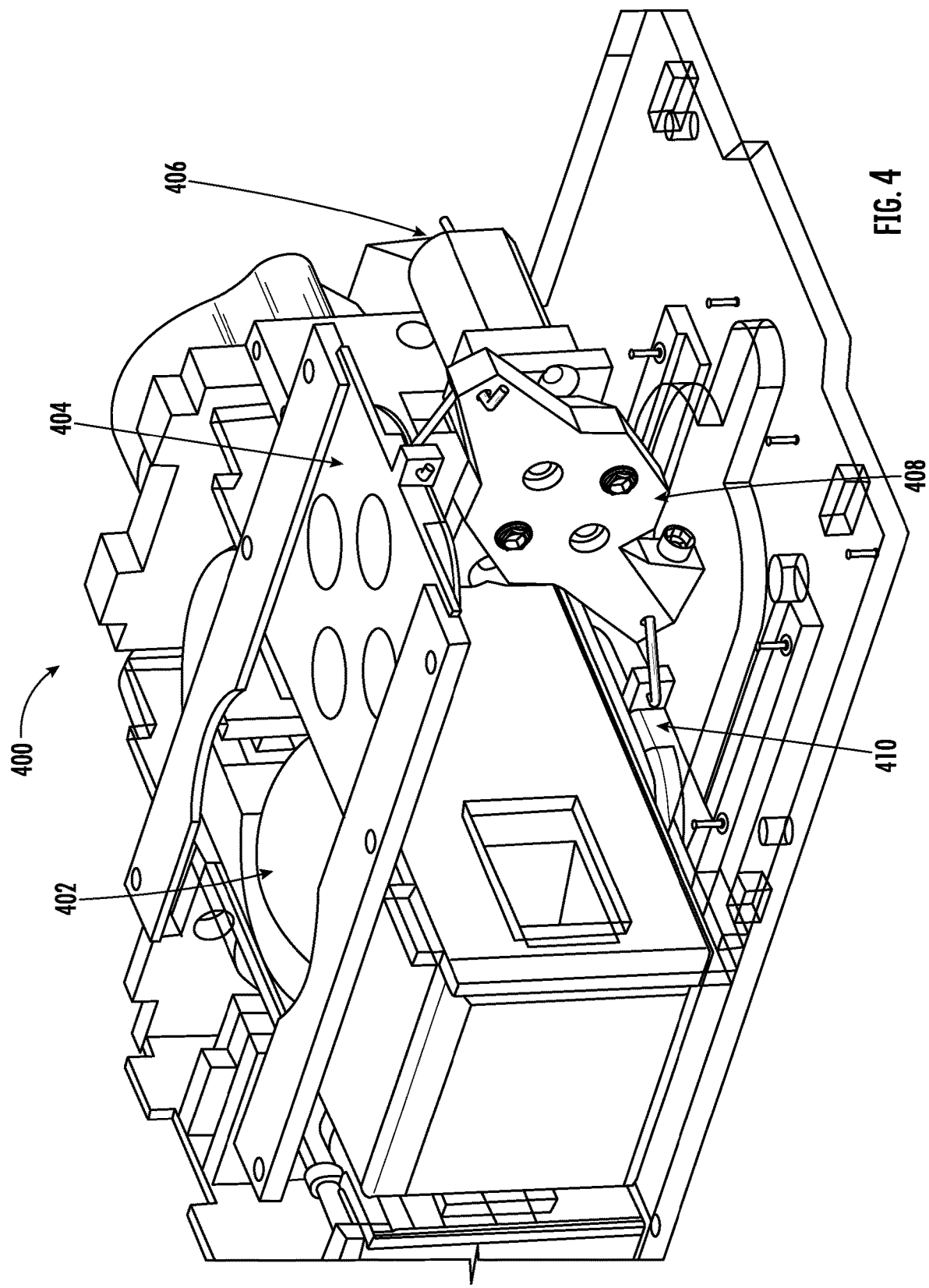

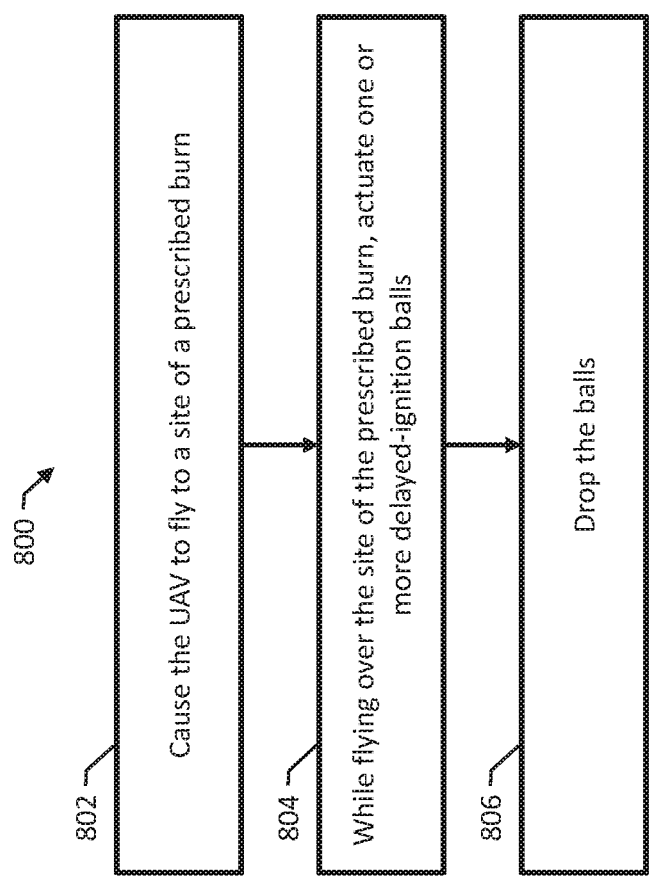

FIRE SUPPRESSION AND IGNITION WITH UNMANNED AERIAL VEHICLES

PRIORITY CLAIM

This application claims the benefit of International Application No. PCT/US2016/057350, filed Oct. 17, 2016, which claims the benefit of U.S. Provisional Application Ser. No. 62/242,485, filed Oct. 16, 2015, the disclosure of which are incorporated herein by reference in their entireties.

GOVERNMENT INTEREST

This invention was made with government support under grant number 2013-67021-20947 awarded by the United States Department of Agriculture. The government has certain rights to this invention.

BACKGROUND

The subject matter described in this specifically relates generally to unmanned aerial vehicles (UAVs), e.g., UAVs configured for fire suppression and ignition.

Fire is a key driver of ecological structure and function in many systems. Fire can improve wildlife habitat, stimulate growth and recruitment of fire adapted woody and herbaceous species, inhibit growth of non-native species not adapted to fire, control insects, and perpetuate fire dependent species. Fire is also uniquely coupled to human activities. Humans have increased the incidence of fire beyond its theoretical occurrence in the absence of human ignitions. Large wildfires are increasing in size and becoming more common, and the cost and human lives lost during wildfire fighting efforts have consistently increased. Most firefighting efforts, however, are not about extinguishing fires. In fact, US guidelines dictate for firefighters are only able to extinguish wildfires with suppression equipment when flame lengths are below 3.5 m. Instead, firefighting commonly involves strategic positioning of personnel for purposes of monitoring or to implement complex ignition techniques in order to affect fire direction or intensity. These two seemingly contradictory needs, suppression and ignition, are related in that a lack of relatively cool frequent fires (as would be conducted under prescription) increases the risk of wildfire; and in that methods developed for prescription can also be applied to wildfire suppression.

Yet, even with overwhelming evidence that fire is critical for sustaining functional dynamics in ecosystems and the high and increasing costs associated with fire management, technologies have not been developed to increase basic fire ignition and monitoring capabilities. Currently, the ability to ignite fires in rough landscapes with little access is limited because we continue to rely on the strategic placement of (1) on-the-ground personnel with drip torches and hand tools to ignite fires, or (2) aerial ignitions using manned helicopters, which is extremely expensive and unavailable to the vast majority of prescribed fire practitioners. Similarly, the ability to monitor fires is mostly limited to (1) strategically placed or mounted observers, and (2) (for larger fires) lagging satellite images.

This context, albeit simplified, exposes several of the gaps that currently limit fire management efforts, which includes both the ignition of fire prescriptions to proactively manage landscapes, and conversely, the control and management of wildfires.

First, personnel on the ground often lack live information that could make them more effective and increase their safety. Even carefully placed observers placed have blind spots, and when aerial support is available (which is rare for small or medium sized fires) observers cannot provide continuous information. Meanwhile, satellite observation is costly and not sufficiently timely. This is important as ground personnel are ubiquitous in fire-fighting and prescription, and are also the most vulnerable to changes in fire conditions, which may occur very rapidly. Second, the use of heavy ground equipment is constrained by the accessibility of the terrain. This implies that the most powerful equipment may not be able to reach critical locations, and even when successful it may require considerable ingress/egress time and effort (e.g., setup of temporary bridges over creeks). Also, accidents caused by the use of such equipment in hazardous conditions are one of the leading cause of fatalities. Accidents involving manned aerial vehicles have accounted for 26% of wildland fire fatalities in the last decade. Third, aerial support is both costly and logistically challenging, especially for non-large fire ignition and management efforts. Further, aerial support for fire ignition is most effective when exposing personnel to high-risk (e.g., flying helicopters low and close to the fire and smoke).

SUMMARY

An Unmanned Air System for Fire Fighting (UAS-FF) can transform the way wildfires are managed, reducing risk by providing a stream of feedback and a larger buffer between fire and personnel, increasing effectiveness by offering more precise ways to manipulate fire direction and intensity, and increasing efficiency by enabling more aggressive ignition patterns. To achieve this, the UAS-FF includes light-weight fire sensing and ignition capabilities, and dependability mechanisms that can detect and handle unexpected behaviors and settings to succeed in extreme environments.

The UAS-FF can include an unmanned aerial vehicle (UAV) configured for fire suppression and ignition. In some examples, the UAV includes an aerial propulsion system, an ignition system, and a control system. The ignition system includes a container of delayed-ignition balls and a dropper configured, by virtue of one or more motors, to actuate and drop the delayed-ignition balls. The control system is configured to cause the UAV to fly to a site of a prescribed burn and, while flying over the site of the prescribed burn, actuate one or more of the delayed-ignition balls. After actuating the one or more delayed-ignition balls, the UAV drops the actuated one or more delayed-ignition balls from the UAV onto the site of the prescribed burn.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations.

Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this speci-

BRIEF DESCRIPTION OF THE DRAWINGS

FIG. 4 is a diagram of an example mechanical dropper;

FIG. 8 is a flow diagram of an example method performed by a control system of a UAV.

DETAILED DESCRIPTION

Figure 1:
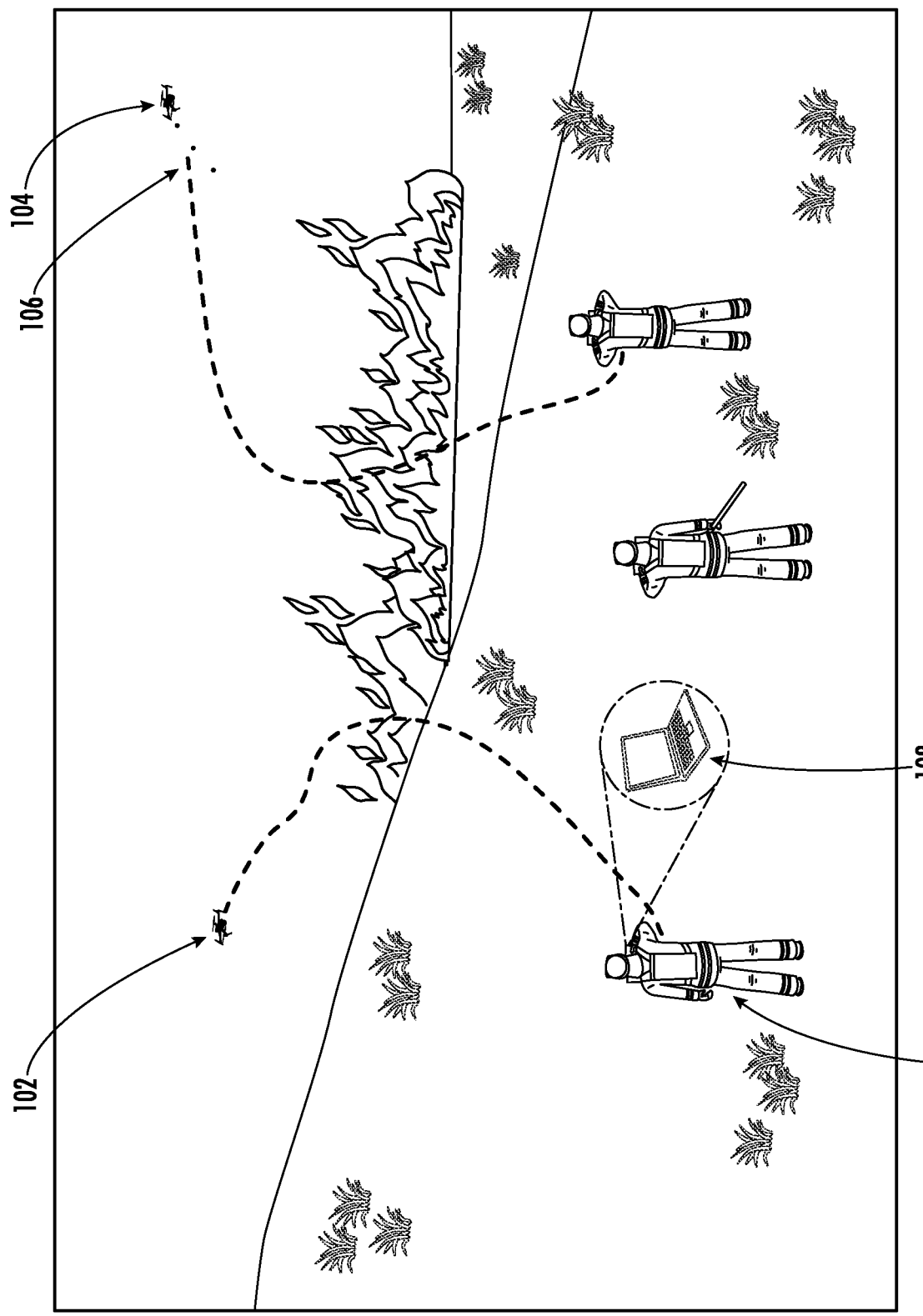
FIG. 1 shows an example Unmanned Aerial System for Fire Fighting.

FIG. 1 shows an example Unmanned Aerial System for Fire Fighting (UAS-FF). From a safe location far from the fire, firefighters 100 deploy UAV-FFs 102 and 104 to monitor conditions in occluded area (left) and to drop fire-ignition balls 106 to continue a line of fire (right).

Fire managers can launch the UAV-FFs from a safe location to ignite fires by dropping fire-ignition balls, dramatically increasing the safety, cost, precision, and timeliness of existing methods of fire ignition such as manual drip torches, manned helicopters, or flare launchers. The UAV-FFs can determine when and where it is safe to fly, and assist the firefighter in prioritizing tasks and avoiding mistakes in the use or application of the vehicle to the particular context. In addition, while in flight, the UAV-FFs can scout over a hill to stream back the progress of a wildfire and determine the micro-climate that will influence the progression of the fire. The system can automatically generate a detailed map and model incorporating data from satellites and manned aircraft in some cases. The UAV-FFs can weigh less than the shovel firefighters carry.

The UAV-FFs can fit in the backpack of a firefighter, be quickly programmed and deployed to gather heat data, broadcast data to firefighters, mark the boundaries of a fire, adapt to fire conditions, and drop a small payload of delayed ignition balls to ignite fire lines. These functional capabilities can be coupled with dependability support mechanisms to provide safeguards for more reliable operation, collaborate with the firefighter to improve the system operation, and provide learning opportunities for the stakeholders.

In some examples, the firefighters can use a user device 108 (or multiple user devices) to control the UAV-FFs 102 and 104. The user device 108 is a computer system such as a laptop, tablet, or smart phone that includes a user input device, a display screen, and a one or more processors configured to program a control system of a UAV with one or more burning patters based on user input the from the user input device.

The user device 108 can be programmed to display a map of the site on the display screen and receive user input specifying the one or more burning patterns in response to displaying the map. Receiving user input can include receiving user input marking one or more points or paths of interest from the map. In some examples, the user device 108 is configured to verify a dynamically adjusted checklist based on data received from a sensor system on a UAV for safety or durability or both. Verifying the dynamically adjusted checklist can include evaluating a set of parameterized checks using the data received from the sensor system.

Figure 2A:
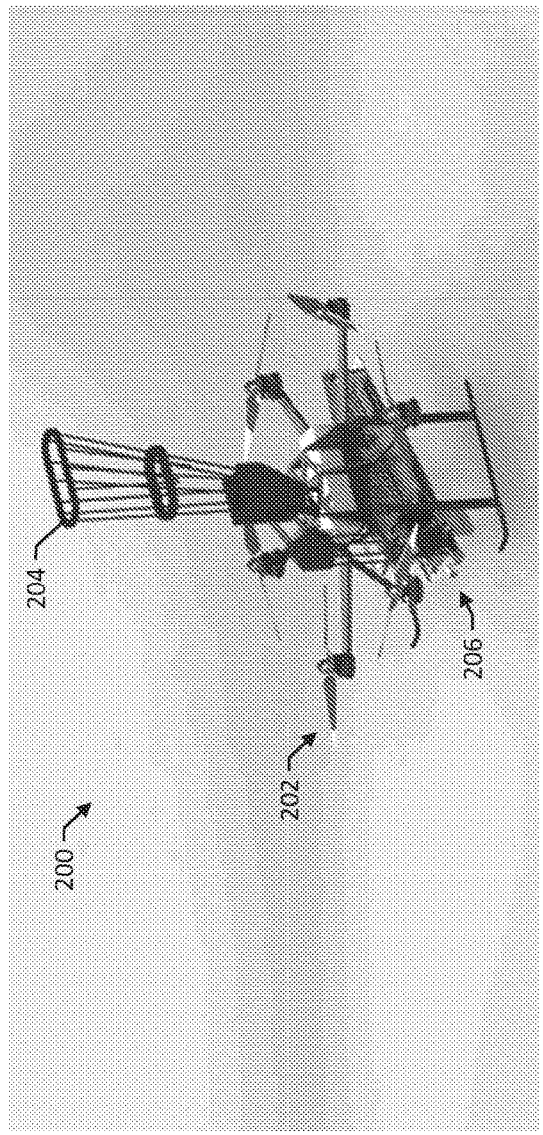
FIGS. 2A-B illustrate an example Unmanned Aerial Vehicle.
Figure 2B:
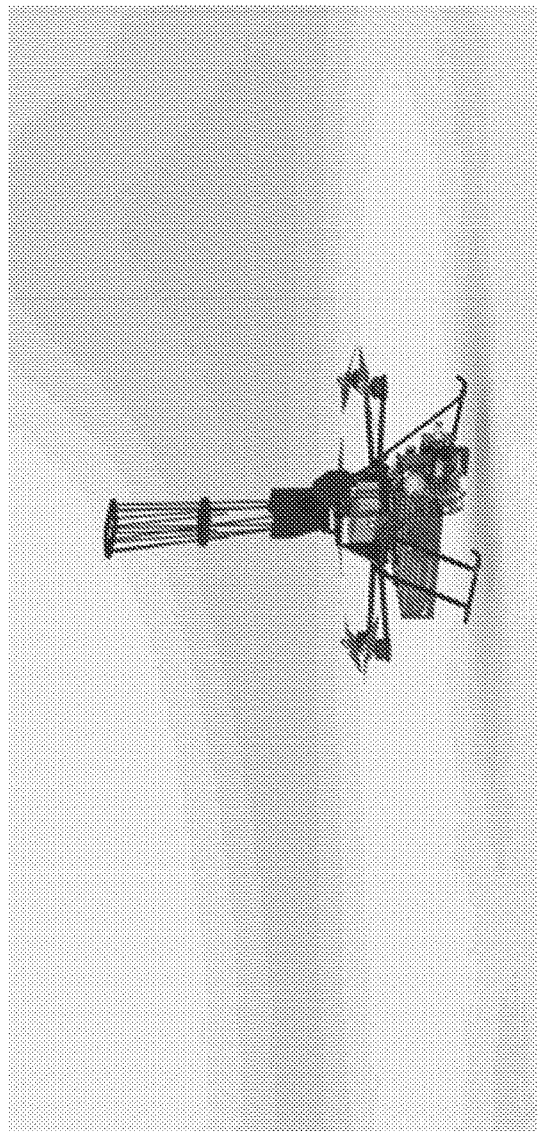
Figure 3A:
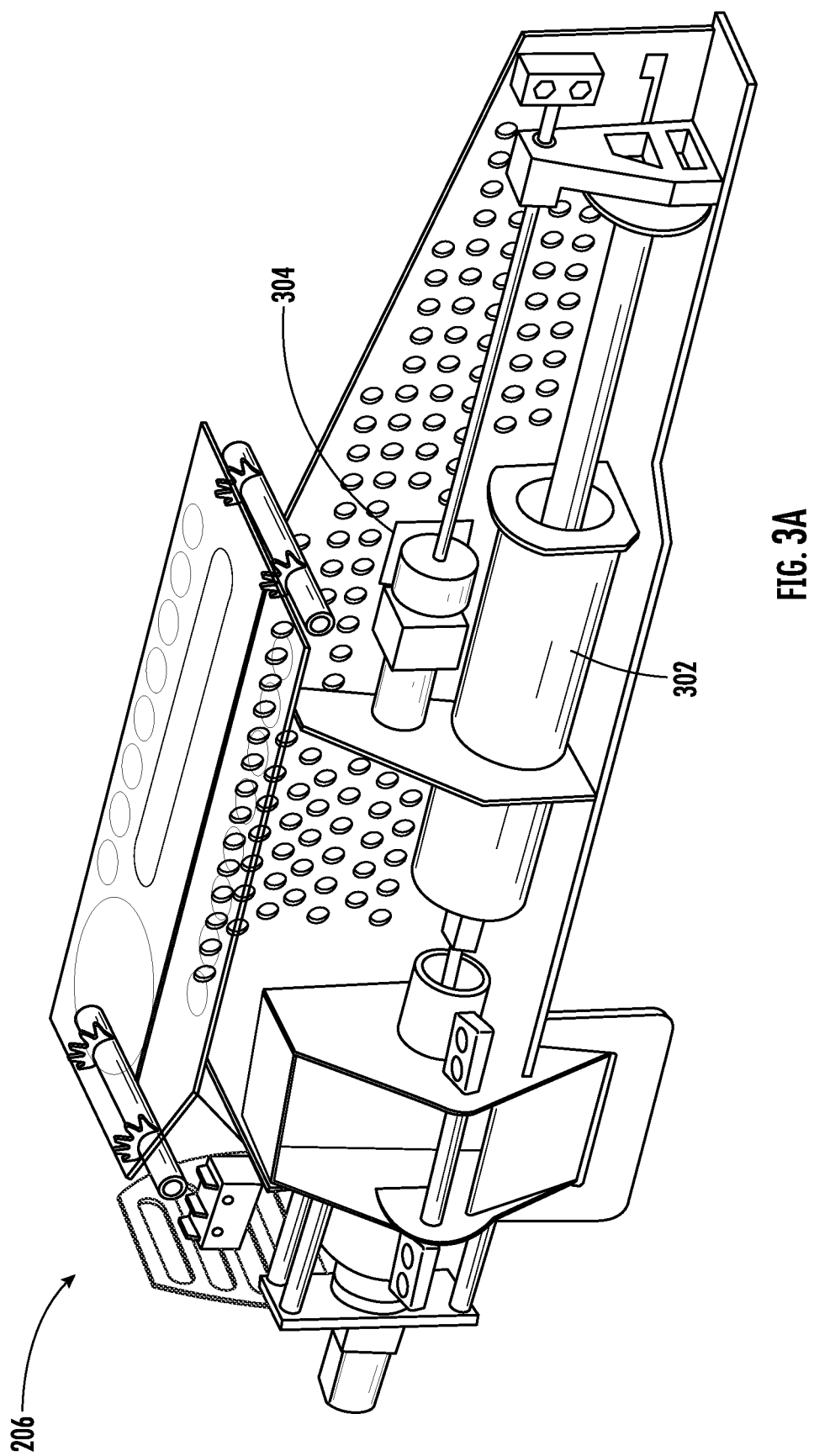
FIGS. 3A-D illustrate an example ignition system.
Figure 3B:
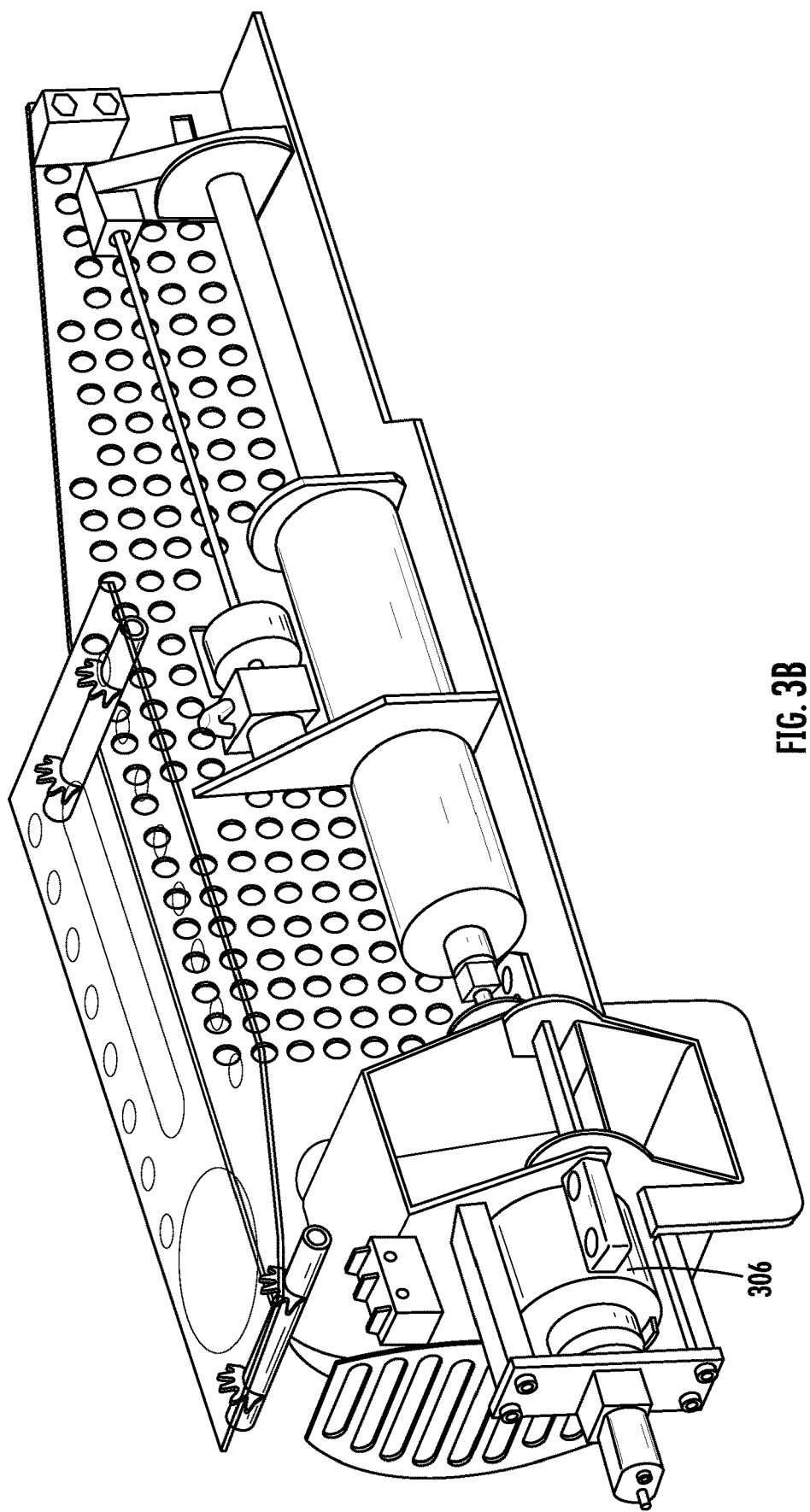
Figure 3C:
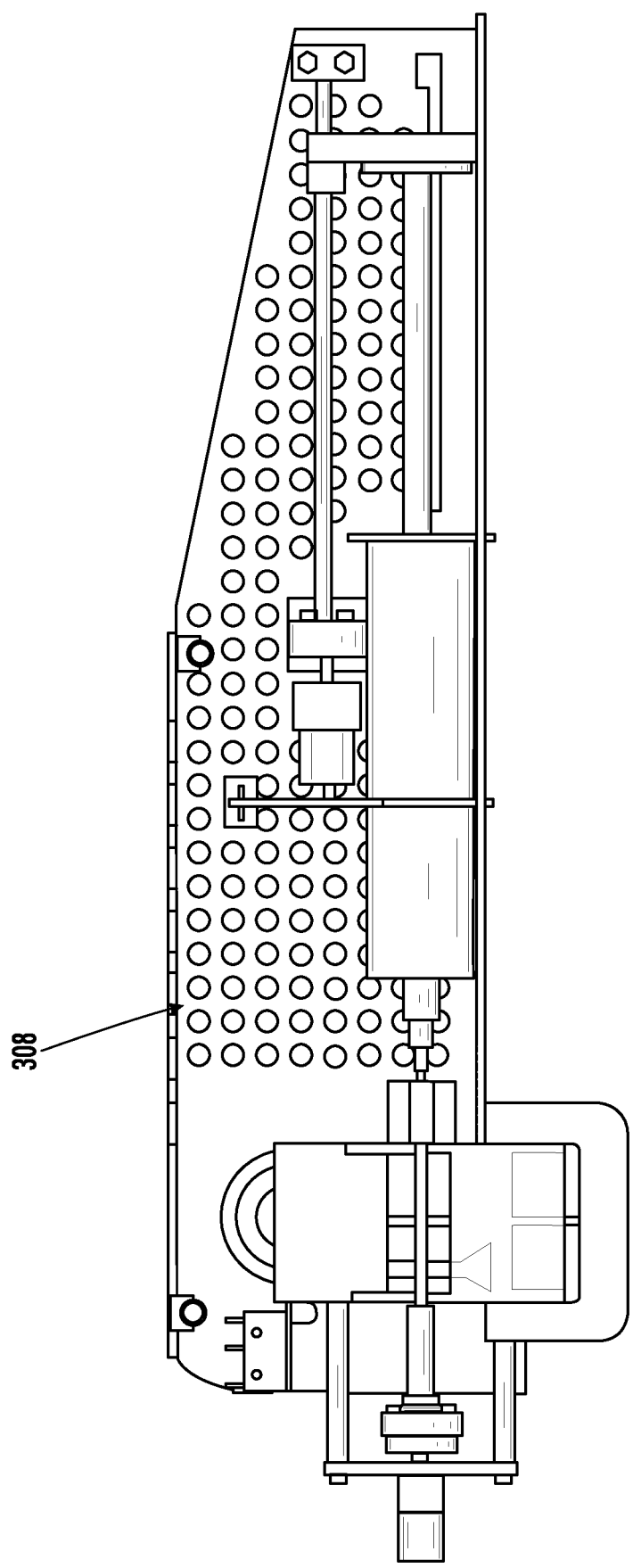
Figure 3D:
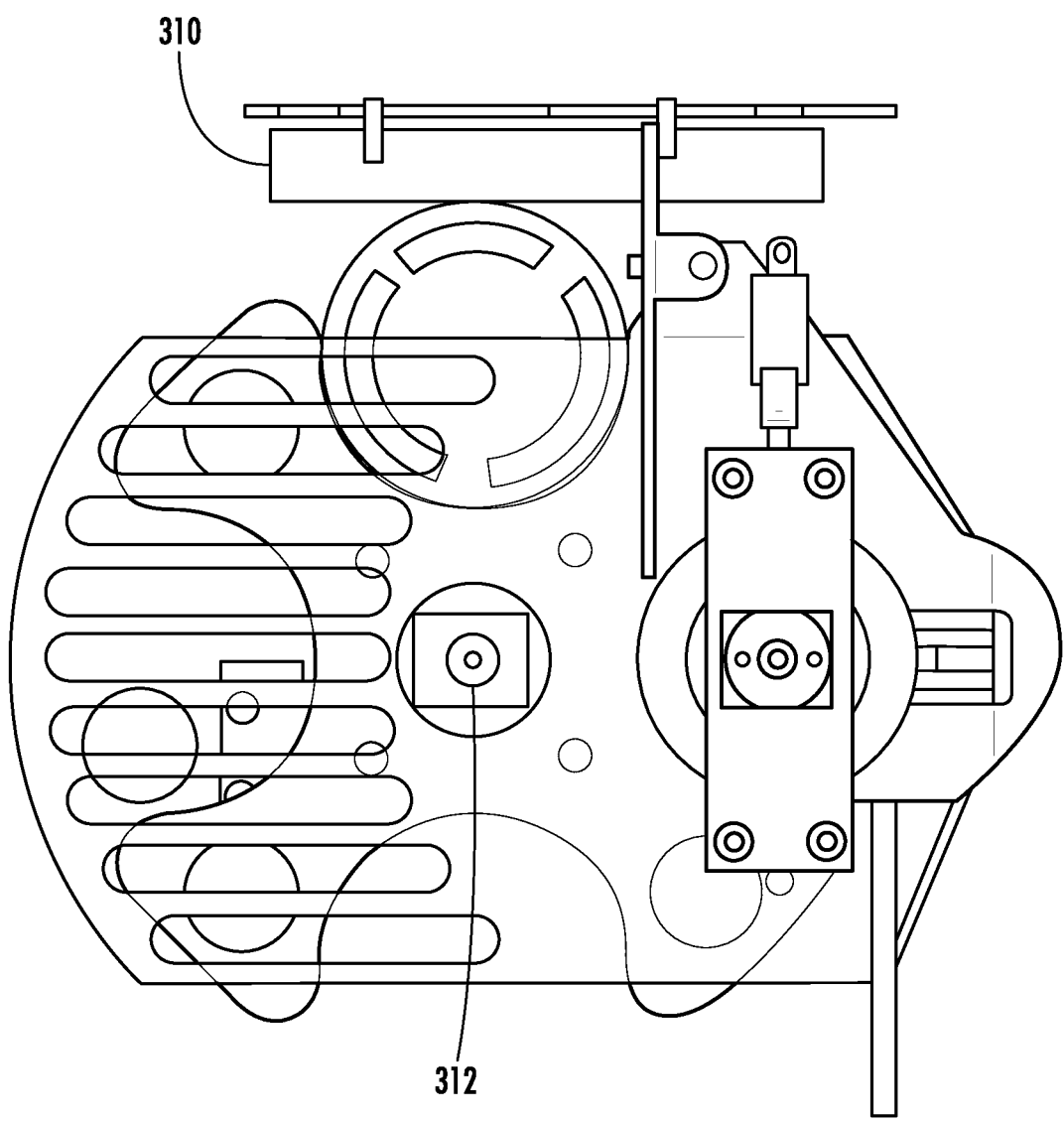

FIGS. 2A-B illustrate an example UAV-FF 200. The vehicle includes a micro-UAV platform 202 that includes an aerial propulsion system, e.g., a multi-rotor propulsion system, and a control system. The vehicle 200 includes an ignition system include a container 204 for delayed-ignition balls and a dropper 206 configured, by virtue of one or more motors, to actuate and drop the delayed-ignition balls.

The control system can be implemented using any appropriate combination of hardware, software, and firmware; for example, the control system can be a microcontroller. The control system is configured, by virtue of appropriate programming, to cause the UAV to fly to the site of a prescribed burn and, while flying over the site of the prescribed burn, actuate one or more of the delayed-ignition balls. The control system causes the UAV to drop the actuated delayed-ignition balls from the UAV onto the site of the prescribed burn.

The vehicle 200 can be configured, by virtue of appropriate selection of battery equipment or radio equipment or both, to operate up to a specified distance from the user, e.g., 1.0 km or 15 km, which will enable land managers considerable flexibility in fire monitoring and the ability to burn small acreages to medium landscape-level fires. The vehicle 200 can be programmed to use any appropriate ignition technique, e.g., dropping a series of balls in close proximity to light a "continuous" flaming fire front at the perimeter of a burn unit. To implement those techniques, the delayed-ignition balls can be dropped, e.g., approximately every 2-5 meters. At a typical flight speed of 5 m/s, the vehicle 200 can drop a ball every second and aim to carry between 50 and 100 balls to enable up to 0.5 km ignition paths.

The vehicle 200 can be built on an Ascending Technologies Firefly UAS, a hex-rotor UAS (e.g., configured so that flight is possible even after a single motor failure) with a weight of 1.5 kg, a flight time of up to 20 minutes, and a maximum speed of 15 m/s (approx. 35 mph). The system can be programmed for autonomous flight and can interface with and record data from cameras and other sensors. In the example shown, the balls are fed into a rotational feeder mechanism and can be remotely controlled. The vehicle 200 can be carried by a single person and then launched and recovered by hand in cluttered locations, such as forests or in the proximity of infrastructure.

The balls are loaded in the container 204 at the top of the vehicle 200. The rest of the ignition system 206 rests centered underneath the vehicle 200. A microprocessor coordinates three small motors that serve to position a ball, perforate it with a needle, and inject Glycol stored in a syringe into the ball to initiate the chemical reaction that will lead to a sustained flame.

The vehicle 200 will drop delayed-ignition balls and can also carry a variety of sensors that will aid in situational awareness for the firefighters and it will use these sensors to optimize and adapt its trajectories and sensing locations. The vehicle 200 can be programmed with algorithms to process and transmit this data in real-time to the firefighters to improve their situational awareness.

The vehicle 200 can include a miniature long-wave length infrared camera, a visual camera, an array of thermal sensors, and it can also be configured, by appropriate sensors, to sense the wind. The vehicle can include a long-wave thermal camera, even one that has a low temperature range (for example only up to 200 Celsius) to identify ignition sites to monitor the progression of the fire. Similarly a visual camera can be used to provide overall situational awareness and for monitoring the height and motion of the head of the fire. A similarly lightweight visual camera can be used to provide overall situational awareness and for monitoring the height and motion of the head of the fire. The vehicle 200 can include lightweight thermistors at 4 to 8 locations on the body of the vehicle 200. These can be used to monitor the temperature of the vehicle and temperature gradients in the air.

In some examples, the vehicle 200 transmits all of this data to all firefighters in real-time; however, bandwidth limitations at a 1-5 km range in harsh atmospheric conditions may limit data transmission. Instead, in some examples, the vehicle 200 uses computationally light data-management algorithms that decide which data is most important to transmit at a given time, while also logging all data for post analysis. The vehicle 200 can use statistical techniques to determine which of the newly collected data is most useful to transmit at a given time, for example, techniques based on Gaussian Processes or by integrated simplified fire propagation models on the vehicle 200. The vehicle 200 can be programmed so that data with low utility (e.g. blurry images or thermal images of unlit areas) has low transmission priority. The data can be input to an existing fire modeling system to help the users predict fire motion, to provide a higher level of detail on the development of the fire and the atmospheric conditions surrounding it, and to help develop new ignition patterns.

FIGS. 3A-D illustrate an example ignition system 206. The system 206 includes a syringe 302 for delivering a chemical to start the chemical reaction in the delayed-ignition balls and a motor 304 for causing the syringe 302 to deliver the chemical by a needle. The system 206 includes another motor 306 for positioning a delayed-ignition ball against the needle and pressing the ball into the needle so that the needle punctures the ball. The system includes a hatch 310, e.g., a motor-controlled hatch that opens and closes to allow a ball to fall from the container 204 into the ignition system 206. The system includes another motor 312 for rotating a slotted ball holder to rotate the ball into position for the needle to puncture the ball.

Since the vehicle 200 will fly close to fires, it is useful to maintain safe flight while in the air and to keep firefighters appraised, especially as conditions change. In order to make the data available in real-time or near real-time to enhance situational awareness, the vehicle 200 can be configured to maintain radio communication with the operator at all times. In addition, if there are other firefighters in the area, the vehicle 200 can be configured to broadcast the information to as many of them as possible to improve their awareness.

When determining where it is safe to fly, there are two risks that change rapidly when flying close to fires. The first is the heat from the fire and the second is the extreme winds that can develop around a fire. To mitigate the risk from heat, the vehicle 200 can use the onboard thermistors to measure the air temperature near the vehicle and the thermal camera to detect hot areas from further away. When possible, the vehicle 200 can compute routes that keep it over unburned areas to reduce heat danger. When it needs to cross a fire, the vehicle 200 can do so by flying sufficiently high to maintain safety. The onboard measurements can be used to update models and to quickly detect increases in temperature to enable rapid onboard re-planning to find a better path to avoid air that is too hot. By using an array of temperature sensors and the motion of the vehicle, the vehicle 200 may be able to detect temperature gradients to generate detailed maps of the air temperature and thermal plumes in real-time to avoid unsafe areas.

The vehicle 200 must also handle the horizontal and vertical winds (e.g. up or downdrafts) that are present near fires. Merging temperature gradient information with the inertial sensors can be used to estimate vertical and horizontal winds. This information can be collected and transmitted to the firefighters and the vehicle 200 can also use this information to determine where it is safe to fly. In addition, wind information can be used to optimize when and where to drop delayed-ignition balls to compensate for local winds in order to increase precision.

In some examples, the vehicle 200 is configured to search out the updrafts to extend the flight time. The vehicle 200 can include physical modifications to better capture the updrafts, such as deploying small "flying squirrel" like wings to increase lift from the updraft. As a failsafe, the ball dropping mechanism can be detachably secured to the vehicle 200 so that it can be discarded if a ball catches fire before it is dropped or if the vehicle 200 requires more maneuverability or lift to fly safely.

Dependability Mechanisms

The potential for the vehicle 200 to assist fire management activities depends, to a great extent, on operating dependably. The vehicle 200 is configured to not only operate reliably under harsh settings, but also help the users avoid errors that can generate additional costs and risks. In particular, the vehicle 200 can use three types of mechanisms: (1) Deployment and Operating Safeguards, (2) Co-Evolved Thresholds, and (3) Learning by Replay. These mechanisms share an underlying theme: to support dependability without requiring users to become pilots or programmers, but rather users of a sophisticated technology in hazardous circumstances.

Deployment and Operating Safeguards

The vehicle 200 can provide safeguards that are context-aware, that is, that perform a series of checks to better understand the extent to which the environment may pose unacceptable risks. This type of safeguard can take the form of a dynamically adjusted checklist that can be verified by the vehicle 200 in conjunction with the operator before and during operation. The checklist can be adjusted and verified based on the information available through the vehicle sensors and any other information the operator is able to provide. For example, the vehicle 200 may report a checklist violation when attempting to operate with low visibility, when air temperature or humidity are outside recommended ranges, when the estimate of duration or distance to complete the activity exceeds vehicle capabilities given wind conditions, and when actions could result in negative public and stakeholder reactions (e.g., dropping ignition balls too close to structures, even when wind would not endanger that structure). These checklists can safeguard the vehicle 200 and surroundings both when flown manually and during autonomous missions that are adapting to changing conditions.

The vehicle 200 can use a set of parameterized checks, e.g., that take the form of Boolean predicates, and the checklist will consist of the union of these predicates. The expressions in these predicates will rely primarily on the sensing capabilities of the vehicle, but could also rely on the operator when sensor information is insufficient. For example, assume that the checklist consists of: $check_1$ (32>temperature>21)∧check$_2$(isConstant(windSpeed))
∧check$_3$(combustibleMaterial>ϕ)∧ . . . ∧check$_1$( . . . ).

Then, check could be performed by the vehicle 200 with its temperature sensors, check$_2$ can be performed by the vehicle in flight but not on the ground when it would require input from the operator, and check$_3$ may require for the operator to make an estimate of the combustible material in the proximity. A run-time verifier can be programmed so that, once the vehicle 200 is ready for deployment, the relevant items in the checklist are assessed. If they hold, the deployment can continue. But, if even one item in the checklist is violated the operator will be warned.

The vehicle 200 can be operated through a map-centric interface. On such interface, the user can mark points or paths of interest, that are then transformed into a plan that the vehicle can follow. The interface can include, for example, a minimalistic tabular interface for the operator to maintain a check list, and a single checklist status indicator that will reveal when the checklist verifier is curtailing deployment because the checklist was violated.

Different scopes can be used as checks may be associated with specific activities, times, and locations, going beyond the initial deployment. For example, checking for wind speed ranges may not make sense when the vehicle is grounded, checking the steps of ignition would only make sense when trying to drop flaming balls, while checking for energy availability should be done continuously. This means that, for example check$_2$(isConstant(windSpeed)), would become check$_2$(isConstant(windSpeed),scope(T,L,E)), where the scope defines when (T), where (L), and what events (E) bound the checking for wind speed. The verifier then needs to understand not just how to check an item, but also under what conditions to check it.

The vehicle 200 can include automatic transitions into a "safe state," for example, by a support subsystem that, in the presence of a violation, can take the vehicle 200 to a safe state so that the operator can take the time to analyze the context. The operator may not be constantly engaged in managing the vehicle, and a warning may go unnoticed or worse yet, generate undesirable reactions. For example, a safe state can be landing in a noncombustible area, but others will greatly depend on context. For example, hovering at a given altitude may be considered safe when there is enough energy to sustain it and a good reachable location can be identified for landing. In other cases, the safe states may really be the safest reachable states given the information available.

Co-Evolved Thresholds

The vehicle 200 and the firefighter can work together. As part of that synergy, the firefighter can provide not just the domain knowledge associated with the fire (e.g., areas to monitor or ignite, checklist items worth verifying), but also to incrementally build an understanding of what to expect from the vehicle 200. The vehicle 200 can be implemented using operating safeguards that will let the user to quickly mark when unexpected behavior occurs, and take a series of remedial actions (e.g., stop, come home, redo a task, take on the next task).

For example, a configuration threshold may indicate how close the UAS-FF may be from a target location to be considered at that target location. If that threshold is set too large, the vehicle 200 may consider that it reached that location way before the firefighter meant for it and perhaps drop an ignited ball at the wrong location. If it is set too small, the vehicle 200 may be in the proximity but never actually get to the target position due to winds. The selection of this configuration threshold is even more difficult as it may depend on the context such as the wind in this case. In such common cases, the system can be configured to recommend how to adjust the parameters to make progress.

The vehicle 200 can be implemented using automated techniques that can, based on control and data flow analysis of the code, identify locations in the system affected by configuration thresholds. For the previous example, these techniques will be able to identify, for example, configuration thresholds set through a property file, constants in a header file, retrieved from a server, or any other variables that are read-only after they are set. These techniques can be complemented with run-time analysis techniques to compare system variables to these configuration thresholds.

FIG. 4 is a diagram of an example mechanical dropper 400. The dropper 400 is configured for loading, piercing, injecting, and releasing the ignition spheres, and the dropper 400 can accomplish these tasks using, e.g., three motors. The structural components of the dropper 400 can be manufactured, e.g., from 3-D printed thermoplastics and laser cut acrylic. The example dropper 400 implements a loading and release system by a pair of sliding hatches controlled by a single motor. The dropper 400 includes an ignition sphere 402 loaded into a chamber, a top hatch door 404, a hatch gearmotor 406, a rocker arm 408, and a bottom hatch door 410.

Figure 5:
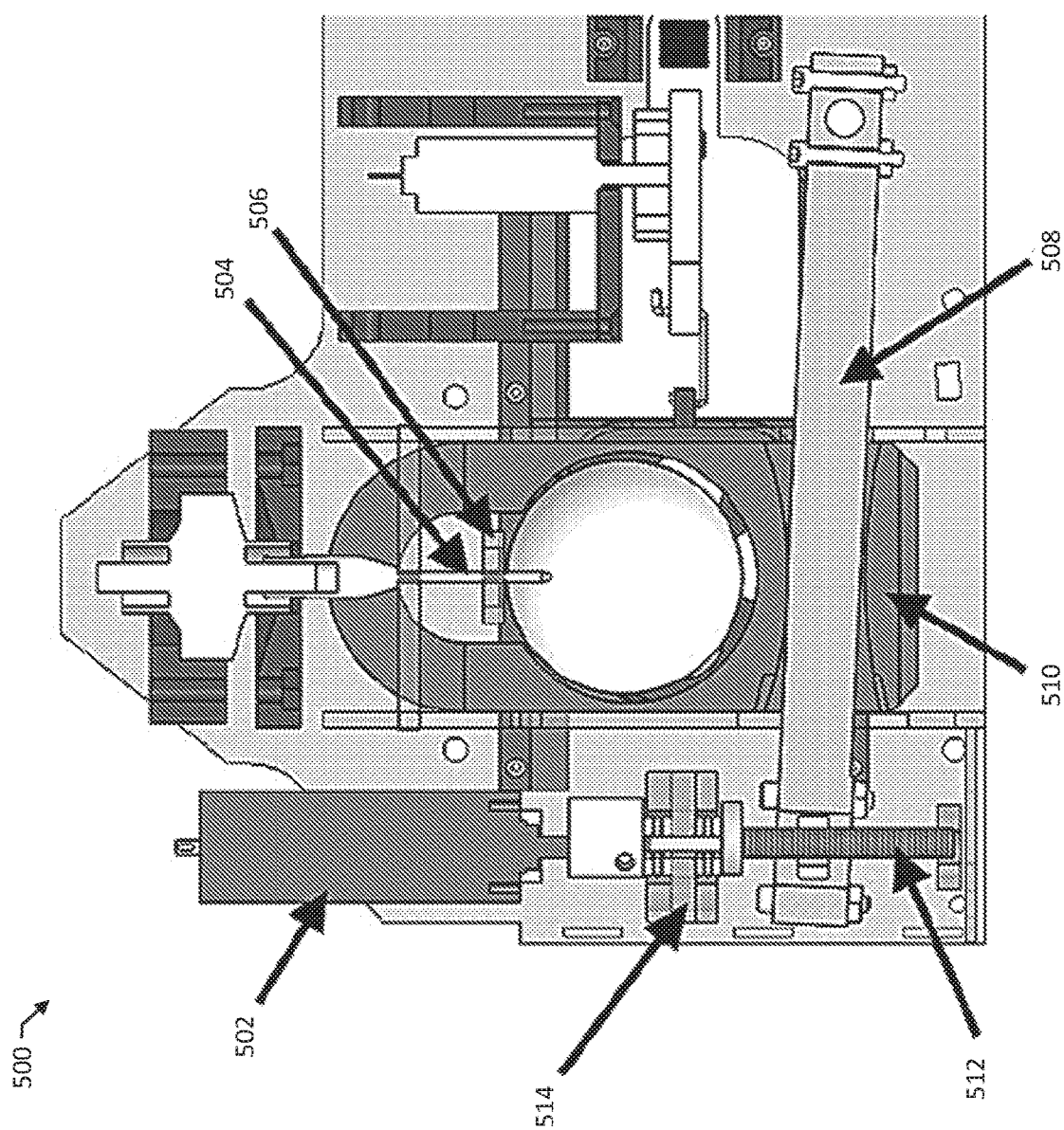
FIG. 5 is a diagram of an example piercing system for the dropper.

FIG. 5 is a diagram of an example piercing system 500 for the dropper 300. The piercing system 500 includes a pierce motor 502, a needle 504, a stopper plate 506, a lever arm 508, a pierce ram 510, a lead screw 512, and a thrust-bearing support plate 514. Once an ignition sphere has fallen into the chamber, the pierce motor 502 pulls on the lever arm 508 and drives the ignition sphere on the needle 506 (e.g., a 16 Gauge stainless-steel needle).

Puncturing the ignition sphere with the needle may require approximately 50N of force; however, in some cases, the shell of the ignition sphere has ribs and a seam of thicker plastic that can require up to 100N of force to pierce. The combination of the pierce motor 502, lead screw 512, and lever arm 508 can be configured to produce a piercing force of, e.g., 130N, assuming 80% loss caused by the lead screw 512 and friction between moving components.

As the pierce ram 510 pushing on the ignition sphere, the curved surface on the interior of the chamber centers the ignition sphere onto the needle 504. This ensures that the needle 504 does not get deflected and bent by an oblique strike on the curvature of the ignition sphere.

Figure 6:
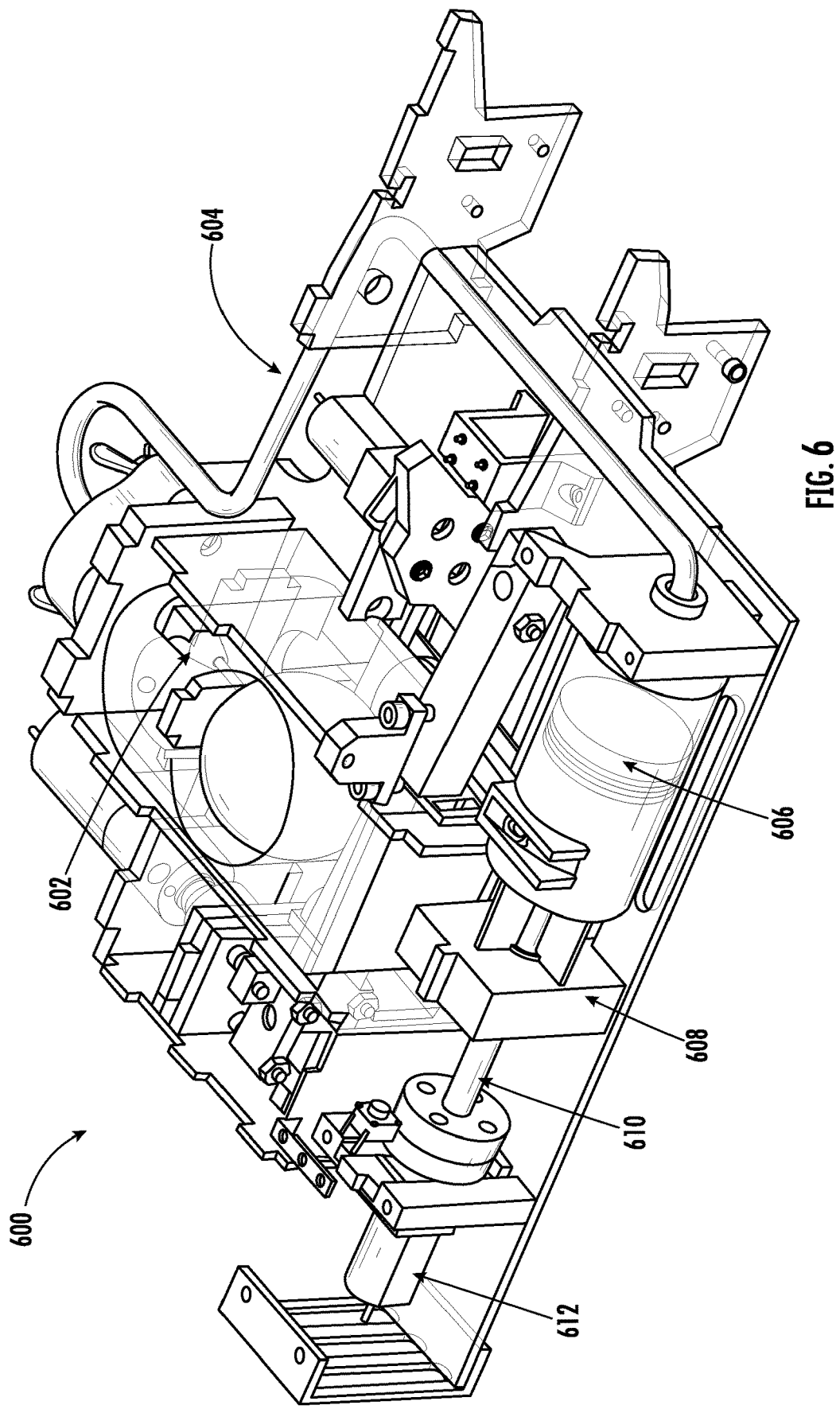
FIG. 6 is a diagram of an example injection system that injects the ignition sphere with antifreeze after it has been pierced.

FIG. 6 is a diagram of an example injection system 600 that injects the ignition sphere with antifreeze after it has been pierced. The injection system 600 includes a needle 602, an antifreeze transfer tube 604, a syringe plunger 606, an injection ram 608, a lead screw 610, and an injection gearmotor 612. In operation, antifreeze is carried in the syringe 606, which gets compressed by the injection gearmotor 612. After compression, the antifreeze travels through the antifreeze transfer tube and out the needle 602.

In some cases, when the ignition sphere is pulled off the needle, there is 2 mm of clearance between the needle tip and the sphere. This is often more than enough to ensure that it will not remain stuck on the needle tip when it needs to be dropped, and to account for any variability in the shape of the ignition sphere.

Figure 7:
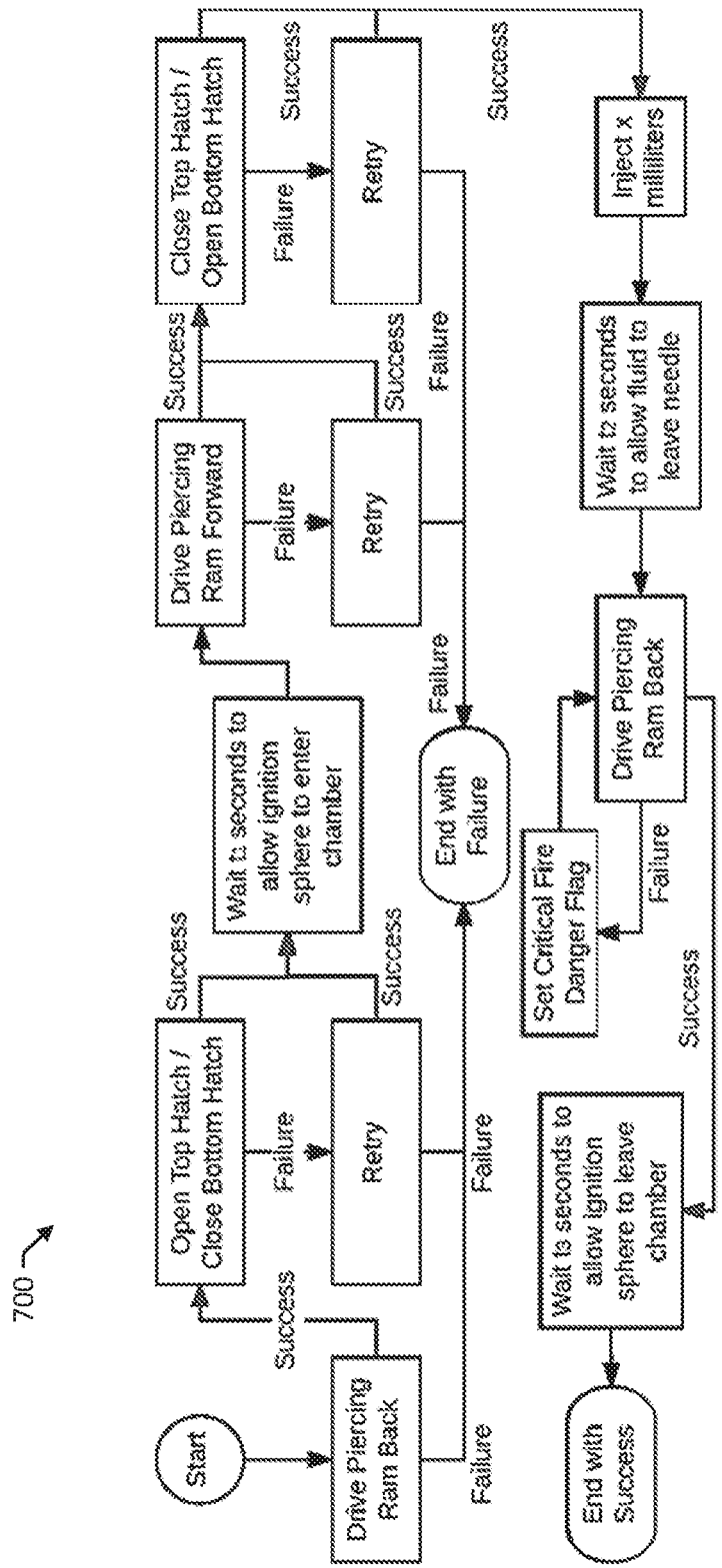
FIG. 7 is a flow diagram of an example procedure that the processor(s) can follow to inject and drop an ignition sphere.

FIG. 7 is a flow diagram of an example procedure 700 that the processor(s) can follow to inject and drop an ignition sphere. The embedded system can be configured to reduce the risk of an ignition within the dropper. This is accomplished by closely monitoring the motors to detect any failures, taking precautions before injecting the ignition sphere, and making the sequence of operations required to inject and drop an ignition sphere an atomic operation from the user's perspective.

The dropper 400 can be controlled by a microcontroller, e.g., on a custom-designed printed circuit board. Each motor is controlled by a motor driver with built-in current sensing and over-current protection. A quadtrature counter chips track the position of magnetic encoders on each motor. Pushbutton switches can be placed at the limit of each actuator's range of motion to calibrate the positions on startup. The processor communicates to the ground station using a 2.4 GHz XBee radio module that has a range of 1 km.

While operating a motor, the processor monitors the current draw and position in a 500 Hz control loop. The processor uses the counter to track the actuator's position, and stop it at the correct place. If the counter stops incrementing or decrementing while the motor is being powered, or if the motor is drawing a large amount of current, the motor is assumed to have stalled, and is stopped to prevent damage. As a failsafe, each operation has a configurable timeout that limits how long the motor will run before the processor considers its next action. Status messages are transmitted from the dropper automatically at a rate of 5 Hz, and inform the operator about what the dropper is trying to do, its state, and any failures that have occurred.

In some examples, the worst case scenario is for an ignition sphere to be injected, but unable to be released. The procedure in FIG. 7 helps reduce the probability that a mechanical failure will lead to this situation by only injecting if the bottom hatch was successfully opened, and if the piercing ram is functional. In the event that the piercing ram is unable to drive back after injection and drop the ignition sphere, the operator is alerted by the critical re danger ag in the periodic status messages transmitted by the Dropper's processor.

In some examples, the operator has limited control over the actuators in the dropper. This is to prevent unintentionally injecting an ignition sphere without dropping it. A single command starts the entire inject and drop process.

FIG. 8 is a flow diagram of an example method 800 performed by a control system of a UAV. The control system causes, using an aerial propulsion system of the UAV, the UAV to fly to a site of a prescribed burn (802). The UAV can be a micro-UAV, e.g., weighing 55 lbs or less and less than two feet long in at least one dimension. The UAV can be configured to meet a weight specification by, e.g., selection of light weight materials and components and by perforating structural elements of the UAV where the perforations do not compromise structural integrity.

While flying over the site of the prescribed burn, the control system actuates, using an ignition system of the UAV, one or more delayed-ignition balls of a plurality of delayed-ignition balls stored in a container of the UAV (804). The ignition system comprises a needle and an ignition motor, and wherein actuating the one or more delayed-ignition balls comprises puncturing, using the ignition motor, the one or more delayed-ignition balls with the needle and injecting, through the needle, the one or more delayed-ignition balls with a chemical to initiate a chemical reaction for ignition In some examples, the ignition system includes a first motor for feeding a delayed-ignition ball from the container into the ignition system, a second motor for positioning the delayed-ignition ball against an actuator, and a third motor for actuating the actuator to trigger ignition of the delayed-ignition ball. In some examples, the ignition system includes a sensor system including one or more motor encoders or one or more limit switches, or both, for the one or more motors, and the method comprises monitoring the sensor system for successful operation of the ignition system. In some examples, the container is attached to a top of the UAV, the ignition system is attached to the UAV below the container, and the ignition system includes a motor-controlled hatch configured to open and close to allow delayed-ignition balls to fall into the ignition system. The motors and the sensor system are configured to work in a coordinated fashion for the ignition system to function as designed and to function safely.

After actuating the one or more delayed-ignition balls, the control system causes the UAV to drop the actuated one or more delayed-ignition balls from the UAV onto the site of the prescribed burn (806).

In some examples, the control system comprises an ambient air temperature sensor, and the method includes monitoring the ambient air temperature sensor and navigating the UAV based on monitoring the ambient air temperature sensor. Navigating the UAV based on monitoring the ambient air temperature sensor can include detecting a higher temperature and flying the UAV to a lower temperature to protect the UAV, or altering an ignition path and flying the UAV along the altered ignition path based on monitoring the ambient air temperature. In some examples, the ambient air temperature sensor includes an array of thermal sensors configured to detect a temperature gradient in the ambient air of the UAV.

In some examples, the ignition system is detachably attached to the UAV, and the method includes causing the ignition system to detach from the UAV in response to detecting an abnormal condition. For example, the ignition system can be suspended from the UAV by a combustible attachment such as fishing wire. When the combustible attachment is consumed by fire, the UAV can navigate away from the area where the ignition system was dropped.

Various combinations and sub-combinations of the structures and features described in this specification are contemplated and will be apparent to a skilled person having knowledge of this disclosure. Any of the various features and elements as disclosed in this specification may be combined with one or more other disclosed features and elements unless indicated to the contrary.

Correspondingly, the subject matter as claimed is intended to be broadly construed and interpreted, as including all such variations, modifications and alternative embodiments, within its scope and including equivalents of the claims. It is understood that various details of the presently disclosed subject matter may be changed without departing from the scope of the claims. Furthermore, the foregoing description is for the purpose of illustration only, and not for the purpose of limitation.

What is claimed is:

1. An unmanned aerial vehicle (UAV) comprising:
    an aerial propulsion system;
    an ignition system comprising a container of delayed-ignition balls and a dropper configured, by virtue of one or more motors, to actuate and drop the delayed-ignition balls, wherein the ignition system comprises a sensor system configured for monitoring the one or more motors; and
    a control system configured to autonomously control the ignition system using the sensor system and to perform operations comprising:
        causing, using the aerial propulsion system, the UAV to fly to a site of a prescribed burn;

while flying over the site of the prescribed burn, actuating, using the ignition system, one or more of the delayed-ignition balls;
monitoring the ignition system using the sensor system; and
after actuating the one or more delayed-ignition balls, dropping the actuated one or more delayed-ignition balls from the UAV onto the site of the prescribed burn;
wherein the ignition system comprises a motor-controlled hatch configured to open and close to allow delayed-ignition balls to fall into the ignition system, and the motor-controlled hatch is controlled by one of the one or more motors, and wherein the control system is configured to use the sensor system to monitor the motor-controlled hatch for successful opening and to cease actuating a next delayed-ignition ball in response to detecting an unsuccessful opening of the motor-controlled hatch.

2. The UAV of claim 1, wherein the ignition system comprises a needle and the one or more motors comprises an ignition motor, and wherein actuating the one or more delayed-ignition balls comprises puncturing, using the ignition motor, the one or more delayed-ignition balls with the needle and injecting, through the needle, the one or more delayed-ignition balls with a chemical to initiate a chemical reaction for ignition.

3. The UAV of claim 1, wherein the one or more motors comprises a first motor for feeding a delayed-ignition ball from the container into the ignition system, a second motor for positioning the delayed-ignition ball against an actuator, and a third motor for actuating the actuator to trigger ignition of the delayed-ignition ball.

4. The UAV of claim 1, wherein the sensor system comprises one or more motor encoders or one or more limit switches, or both, for the one or more motors, and wherein the operations comprise monitoring the sensor system for successful operation of the ignition system.

5. The UAV of claim 1, wherein the control system comprises an ambient air temperature sensor, and wherein the operations comprise monitoring the ambient air temperature sensor and navigating the UAV based on monitoring the ambient air temperature sensor.

6. The UAV of claim 5, wherein navigating the UAV based on monitoring the ambient air temperature sensor comprises one or more of: detecting a higher temperature and flying the UAV to a lower temperature to protect the UAV; and altering an ignition path and flying the UAV along the altered ignition path based on monitoring the ambient air temperature.

7. The UAV of claim 5, wherein the ambient air temperature sensor comprises an array of thermal sensors configured to detect a temperature gradient in the ambient air of the UAV.

8. The UAV of claim 1, wherein the container is attached to a top of the UAV, the ignition system is attached to the UAV below the container.

9. The UAV of claim 1, wherein the ignition system is detachably attached to the UAV, and wherein the operations comprise causing the ignition system to detach from the UAV in response to detecting an abnormal condition.

10. The UAV of claim 1, wherein the UAV weighs 55 lbs or less and is less than two feet long in at least one dimension.

11. A method performed by a control system of an unmanned aerial vehicle (UAV), the method comprising:

causing, using an aerial propulsion system of the UAV, the UAV to fly to a site of a prescribed burn;
while flying over the site of the prescribed burn, autonomously controlling an ignition system of the UAV for actuating one or more delayed-ignition balls of a plurality of delayed-ignition balls stored in a container of the UAV, wherein the ignition system comprises one or more motors and a sensor system configured for monitoring the one or more motors, and wherein autonomously controlling the ignition system comprises monitoring the ignition system using the sensor system, wherein the ignition system comprises a motor-controlled hatch configured to open and close to allow delayed-ignition balls to fall into the ignition system, and the motor-controlled hatch is controlled by one of the one or more motors, and wherein autonomously controlling the ignition system comprises using the sensor system to monitor the motor-controlled hatch for successful opening;
after actuating the one or more delayed-ignition balls, dropping the actuated one or more delayed-ignition balls from the UAV onto the site of the prescribed burn; and
ceasing actuating a next delayed-ignition ball in response to detecting an unsuccessful opening of the motor-controlled hatch.

12. The method of claim 11, wherein the ignition system comprises a needle and the one or more motors comprises an ignition motor, and wherein actuating the one or more delayed-ignition balls comprises puncturing, using the ignition motor, the one or more delayed-ignition balls with the needle and injecting, through the needle, the one or more delayed-ignition balls with a chemical to initiate a chemical reaction for ignition.

13. The method of claim 11, wherein the one or more motors comprises a first motor for feeding a delayed-ignition ball from the container into the ignition system, a second motor for positioning the delayed-ignition ball against an actuator, and a third motor for actuating the actuator to trigger ignition of the delayed-ignition ball.

14. The method of claim 11, wherein the sensor system comprises one or more motor encoders or one or more limit switches, or both, for the one or more motors, and wherein the method comprises monitoring the sensor system for successful operation of the ignition system.

15. The method of claim 11, wherein the control system comprises an ambient air temperature sensor, and wherein the method comprises monitoring the ambient air temperature sensor and navigating the UAV based on monitoring the ambient air temperature sensor.

16. The method of claim 15, wherein navigating the UAV based on monitoring the ambient air temperature sensor comprises one or more of: detecting a higher temperature and flying the UAV to a lower temperature to protect the UAV; and altering an ignition path and flying the UAV along the altered ignition path based on monitoring the ambient air temperature.

17. The method of claim 15, wherein the ambient air temperature sensor comprises an array of thermal sensors configured to detect a temperature gradient in the ambient air of the UAV.

18. The method of claim 11, wherein the container is attached to a top of the UAV, the ignition system is attached to the UAV below the container.

19. The method of claim 11, wherein the ignition system is detachably attached to the UAV, and wherein the operations comprise causing the ignition system to detach from the UAV in response to detecting an abnormal condition.

20. The method of claim 11, wherein the UAV weighs 55 lbs or less and is less than two feet long in at least one dimension.

21. A system comprising:
an unmanned aerial vehicle (UAV) comprising:
an aerial propulsion system;
an ignition system comprising a container of delayed-ignition balls and a dropper configured, by virtue of one or more motors, to actuate and drop the delayed-ignition balls, wherein the ignition system comprises a sensor system configured for monitoring the one or more motors; and
a control system configured to autonomously control the ignition system using the sensor system and to autonomously fly the UAV to a site of a prescribed burn and use the ignition system to ignite a preprogrammed burning pattern at the site, including monitoring the ignition system using the sensor system; and
a user device comprising a user input device and a display screen and one or more processors configured to program the control system of the UAV with one or more burning patterns based on user input from the user input device;
wherein the ignition system comprises a motor-controlled hatch configured to open and close to allow delayed-ignition balls to fall into the ignition system, and the motor-controlled hatch is controlled by one of the one or more motors, and wherein the control system is configured to use the sensor system to monitor the motor-controlled hatch for successful opening and to cease actuating a next delayed-ignition ball in response to detecting an unsuccessful opening of the motor-controlled hatch.

22. The system of claim 21, wherein the user device is configured to display a map of the site on the display screen and receive user input specifying the one or more burning patterns in response to displaying the map.

23. The system of claim 22, wherein receiving the user input comprises receiving user input marking one or more points or paths of interest from the map.

24. The system of claim 21, wherein the user device or the control system or both are configured to verify a dynamically adjusted checklist based on data received from the sensor system for safety or durability or both.

25. The system of claim 24, wherein verifying the dynamically adjusted checklist comprises evaluating a set of parameterized checks using the data received from the sensor system.

* * * * *